United States Patent
Hudson et al.

(10) Patent No.: US 7,441,331 B2
(45) Date of Patent: Oct. 28, 2008

(54) TURBINE ENGINE COMPONENT MANUFACTURE METHODS

(75) Inventors: Eric A. Hudson, Harwinton, CT (US); Benjamin R. Harding, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 575 days.

(21) Appl. No.: 10/926,467

(22) Filed: Aug. 26, 2004

(65) Prior Publication Data

US 2006/0042084 A1    Mar. 2, 2006

(51) Int. Cl.
*B21K 3/04* (2006.01)
*B23P 15/02* (2006.01)

(52) U.S. Cl. .............................. 29/889.721; 29/889.71; 29/889.72; 29/412; 29/469; 29/557; 29/558; 416/232

(58) Field of Classification Search .............. 29/889.72, 29/889.721, 889.71, 412, 469, 557, 558; 416/232
See application file for complete search history.

(56) References Cited

U.S. PATENT DOCUMENTS

| 4,364,160 | A | * | 12/1982 | Eiswerth et al. ........ 29/889.721 |
| 4,507,051 | A | | 3/1985 | Lesgourgues et al. |
| 4,768,700 | A | | 9/1988 | Chen |
| 5,063,662 | A | | 11/1991 | Porter et al. |
| 5,318,406 | A | * | 6/1994 | Bardes ................... 416/223 A |
| 5,640,767 | A | | 6/1997 | Jackson et al. |
| 5,711,068 | A | | 1/1998 | Salt |
| 5,976,337 | A | | 11/1999 | Korinko et al. |
| 6,162,347 | A | | 12/2000 | Fleck |
| 6,579,061 | B1 | | 6/2003 | Heyward et al. |
| 6,582,194 | B1 | * | 6/2003 | Birkner et al. ............ 416/97 R |
| 6,705,011 | B1 | | 3/2004 | Leibfried et al. |
| 6,974,637 | B2 | * | 12/2005 | Pfaendtner et al. .......... 428/632 |

FOREIGN PATENT DOCUMENTS

JP    2004-100543 A    4/2004

OTHER PUBLICATIONS

European Search Report for EP Patent Application No. 05253843.6.
Japanese Patent Office, Office Action for Application 2005-184540 dated Dec. 18, 2007(11 pages).

* cited by examiner

*Primary Examiner*—David P. Bryant
*Assistant Examiner*—Sarang Afzali
(74) *Attorney, Agent, or Firm*—Bachman & LaPointe, P.C.

(57) ABSTRACT

A cooled turbine engine component is made by providing first and second pieces respectively having first and second surfaces. At least one circuit is formed in at least one of the first and second surfaces. A first plurality of apertures is provided in the first piece to form inlets to the at least one circuit. A second plurality of apertures is provided in the second piece to form outlets to the at least one circuit. A combination of the first and second pieces is assembled and integrated.

21 Claims, 9 Drawing Sheets

US 7,441,331 B2

TURBINE ENGINE COMPONENT MANUFACTURE METHODS

U.S. GOVERNMENT RIGHTS

The invention was made with U.S. Government support under contract F33615-97-C-2779 awarded by the U.S. Air Force. The U.S. Government has certain rights in the invention.

BACKGROUND OF THE INVENTION

This invention relates to the manufacture of turbine elements such as airfoils like blades and vanes. More particularly the invention relates to the manufacture of turbine elements via integration of multiple components.

A variety of manufacturing techniques are used to make metallic components of gas turbine engines such as blades and vanes. One family of techniques involves investment casting. However, some component materials are not readily susceptible to investment casting. With such materials, machining from ingots or other stock is required. Direct machining imposes severe constraints on the flexibility to machine internal features. Accordingly, it is known to machine components in pieces and then integrate the pieces via diffusion bonding. Examples of diffusion bonding in turbine blade formation (e.g., using Ti-6Al-4V) are found in U.S. Pat. Nos. 5,063,662 and 5,711,068. The '662 patent discloses a detailed process for forming a twisted hollow blade having internal structure. The process involves the diffusion bonding of two blade halves followed by additional deformation and machining. The '068 patent discloses a specific situation in which the two blade halves are cut from a single piece and are diffusion bonded with uncut surfaces facing each other. Nevertheless, there remains room for improvement in the art.

SUMMARY OF THE INVENTION

One aspect of the invention involves a method for manufacturing a turbine engine component having one or more internal feed passageways, one or more external walls, and one or more outlet passageways. One or more cuts are made in a workpiece to create a plurality of separate subpieces each having one or more cut surfaces. A plurality of apertures are machined in the one or more cut surfaces. A combination of the subpieces or of like subpieces is reassembled and integrated. Internal feed passageways and exterior surfaces of the one or more walls are machined so that at least some of the outlet passageways are formed by combinations of the apertures from separate ones of the subpieces.

In various implementations, some of the passageways may be formed by single ones of the apertures. Some of the apertures may form internal connecting passageways between associated pairs of the feed passageways. The cutting may comprise wire electro-discharge machining. At least a first of the cuts may be arcuate. Machining the internal feed passageways may comprise electrochemical machining. The integrating may comprise transient liquid phase (TLP) bonding, diffusion bonding, or at least one of welding and brazing. The component may include an airfoil having a pressure side surface and a suction side surface. A junction between a first of the subpieces and a second of the subpieces may be locally generally parallel to one of the pressure and suction side surfaces. The combination may be assembled to an airfoil end piece and integrated with the airfoil end piece. The airfoil end piece may be machined to form at least one of a vane inboard platform, a vane outboard platform, a blade root structure, and a blade tip shroud. Registration features may be formed and the reassembling may comprise registering the registration features. The workpiece may be a refractory metal alloy.

Another aspect involves similarly cutting a plurality of metallic workpieces into first and second subpieces forming first and second cut surfaces on the first and second subpieces, respectively. A plurality of apertures are machined through at least the first cut surface of each first subpiece. Pairs of the first and second subpieces are assembled and integrated. At least one internal passageway is machined transverse to the plurality of apertures in each of the pairs so as to ultimately intersect therewith. There is an external surface machining of each pair.

In various implementations, the machining of the at least one internal passageway may be after the integrating. The integrating may consist essentially of TLP bonding or diffusion bonding. The method may be used to form a turbine engine component. The similarly cutting may further cut the plurality of workpieces into a third subpiece. The assembling and integrating may be of trios of the first, second, and third subpieces. The similarly cutting may further cut the plurality of workpieces into a fourth subpiece. The assembling and integrating may be of quartets of the first, second, third, and fourth subpieces. The cutting may comprise making a plurality of substantially nonparallel cuts.

Another aspect of the invention involves an article having a metallic wall. At least one non-line-of-sight passageway extends through the wall. An arcuate integration junction is within the wall.

In various implementations, the metallic wall may comprise a refractory metal alloy. The article may be a blade outer air seal wherein the junction is parallel to an inboard surface of the seal.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
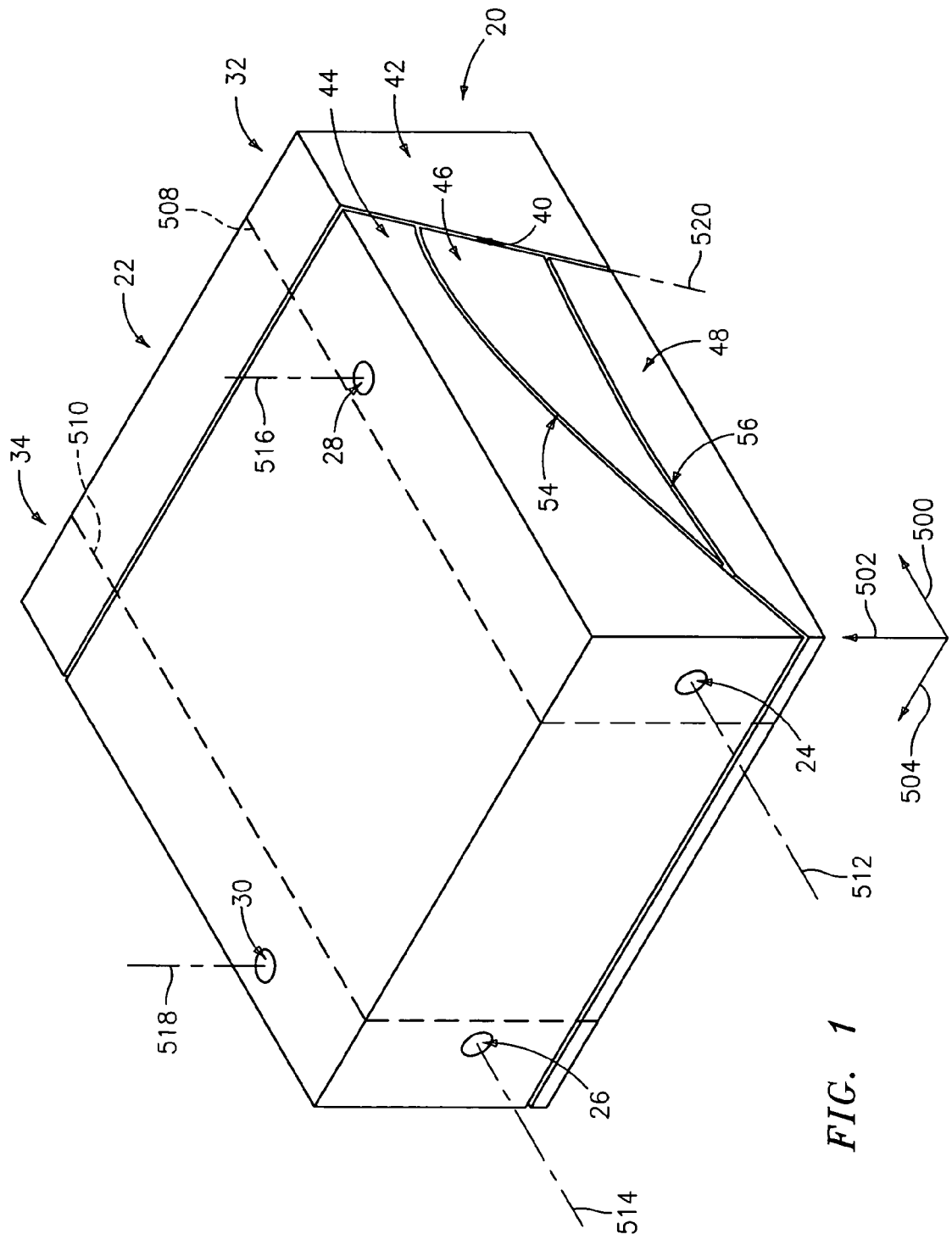
FIG. 1 is a view of a turbine element blade precursor.

FIG. 1 shows an airfoil precursor block 20 after initial machining stages. The exemplary block 20 may initially be formed as a single-piece right parallelepiped of a metallic material. Exemplary metallic materials are refractory metals and refractory metal-based alloys and combinations of such metals and alloys with refractory metal intermetallics. Exemplary alloys are molybdenum alloys and niobium alloys preferably with intermetallics of molybdenum and niobium, respectively. Exemplary intermetallic contents are greater than 5% by volume (more narrowly, 10-80%, or 20-50%). Exemplary intermetallics are suicides. An exemplary essentially pure molybdenum with molybdenum silicide has a molybdenum silicide content of 10-45%. An exemplary essentially pure niobium with niobium silicide has a molybdenum silicide content of 20-80%.

The parallelepiped has axes 500, 502, and 504 which may, for reference, be assigned as X, Y, and Z directions. A central portion 22 of the block is located generally between constant-Z planes 508 and 510 and, ultimately, substantially forms the airfoil of a turbine element such as a blade or vane. An exemplary first of the initial machining stages involves forming registration features to subsequently facilitate the alignment of subpieces cut from the block 20. In the exemplary embodiment, this machining takes the form of drilling holes into the block. In the exemplary embodiment, the holes are through-holes or bores between opposed faces of the block. Exemplary holes 24 and 26 extend between the constant-X faces of the block and have axes 512 and 514 parallel to the axis 500. Holes 28 and 30 extend between the constant-Y faces and have axes 516 and 518 parallel to the axis 502. In the exemplary embodiment, the holes 24, 26, 28, and 30 are in portions 32 and 34 outboard of the central portion 22. During such drilling, the block may be registered in a fixture (not shown) by means of one or more of its faces.

A second of the initial machining stages involves cutting the block into the subpieces. This exemplary cutting is performed via wire electro-discharge machining (EDM) process. To facilitate the cutting, the block may be registered in a cutting fixture via the drilled holes. The cutting fixture may securely hold each of the portions of the block that will become the subpieces. In the exemplary embodiment, a first cut 40 extends between the two constant-Y faces and the two constant-Z faces and is a planar cut in a plane 520 parallel to the Z-direction 504. This exemplary first cut 40 separates a leading subpiece 42 from a remainder of the block (namely from portions 44, 46, and 48 that will become identified as a suction side subpiece; a core subpiece; and a pressure side subpiece, respectively, after second and third cuts). The second cut 54 is arcuate but, in the exemplary embodiment, parallel to the Z-direction 504. This second cut 54 separates the pressure side subpiece 44 from the remainder of the block 20. The third cut 56 separates the suction side subpiece 48 from the core subpiece 46. The exemplary third cut 56 is also arcuate and parallel to the Z-direction 504. It is noted that the cuts need not be parallel to the Z-direction. Non-parallel cuts could be particularly useful to preform a blade having twist, taper, or other spanwise variance in the shape, size, or orientation of its cross-section.

Figure 2:
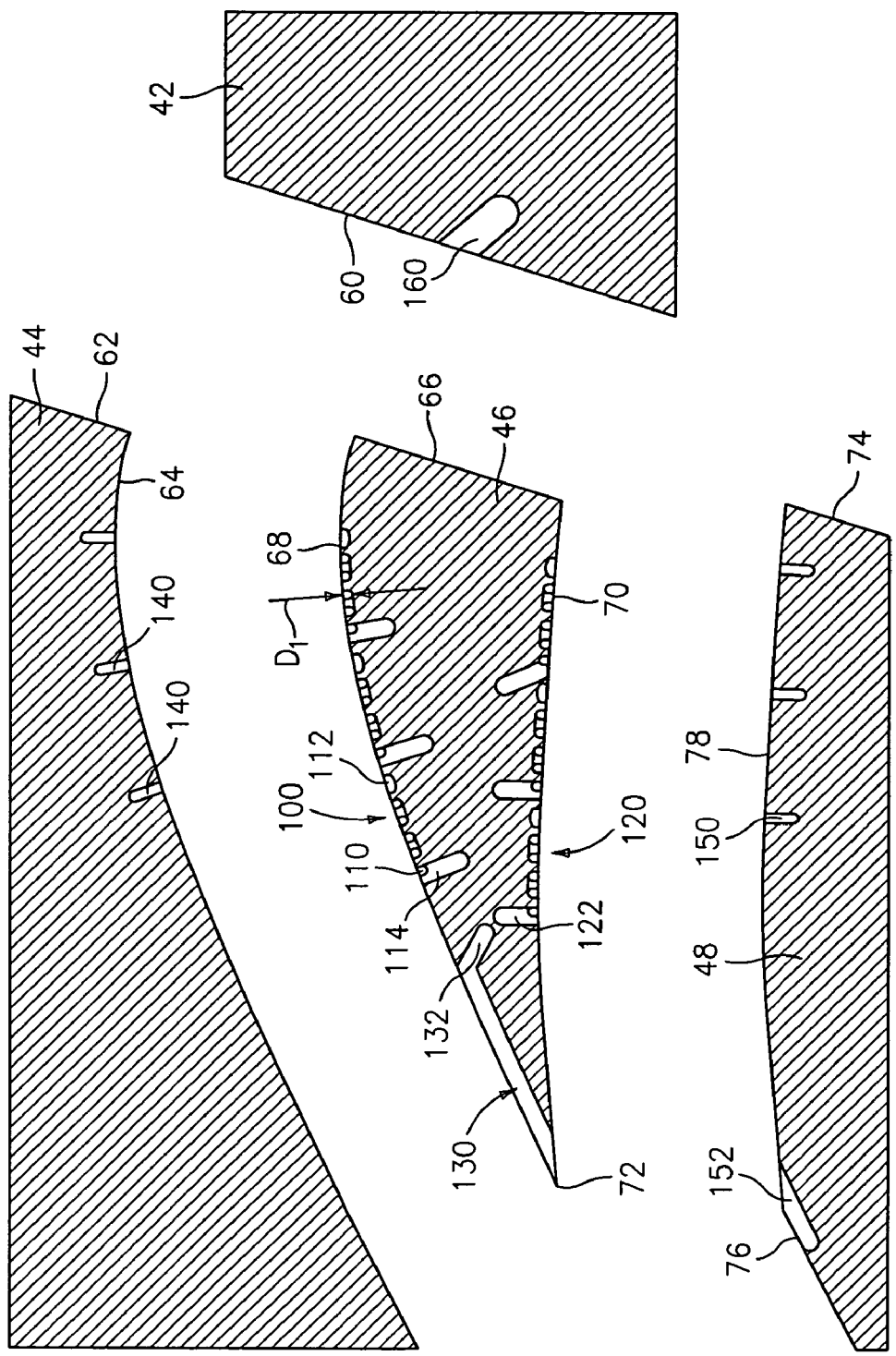
FIG. 2 is an exploded sectional view of the precursor of FIG. 1.

FIG. 2 shows the leading subpiece 42 having a planar cut surface 60 resulting from the first cut 40. The suction side subpiece 44 has a planar first cut surface 62 resulting from the first cut 40 and a continuously curving concave second cut surface 64 resulting from the second cut 54. The core subpiece 46 has a planar first cut surface 66 resulting from the first cut 40, a continuously curving convex second cut surface 68 resulting from the second cut 54 and a continuously curving concave third cut surface 70 resulting from the third cut 56. The surfaces 68 and 70 meet at junction defining a core subpiece trailing edge 72. The suction side subpiece 48 has a planar first cut surface 74 resulting from the first cut 40, a continuously curving convex second cut surface 76 resulting from the second cut 54, and a continuously curving convex third cut surface 78 resulting from the third cut 56.

Figure 3:
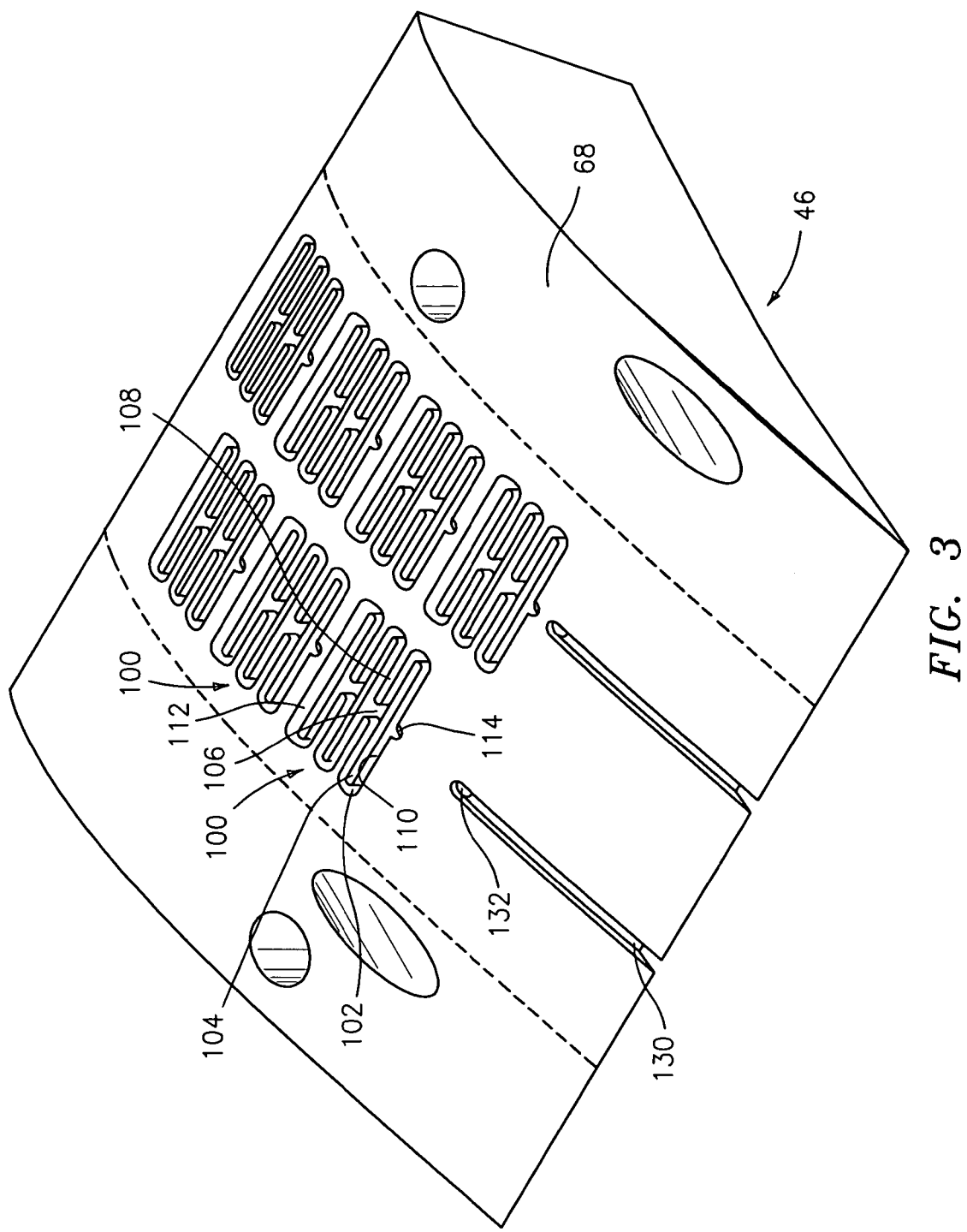
FIG. 3 is a view of a core subpiece of the precursor of FIG. 1.
Figure 4:
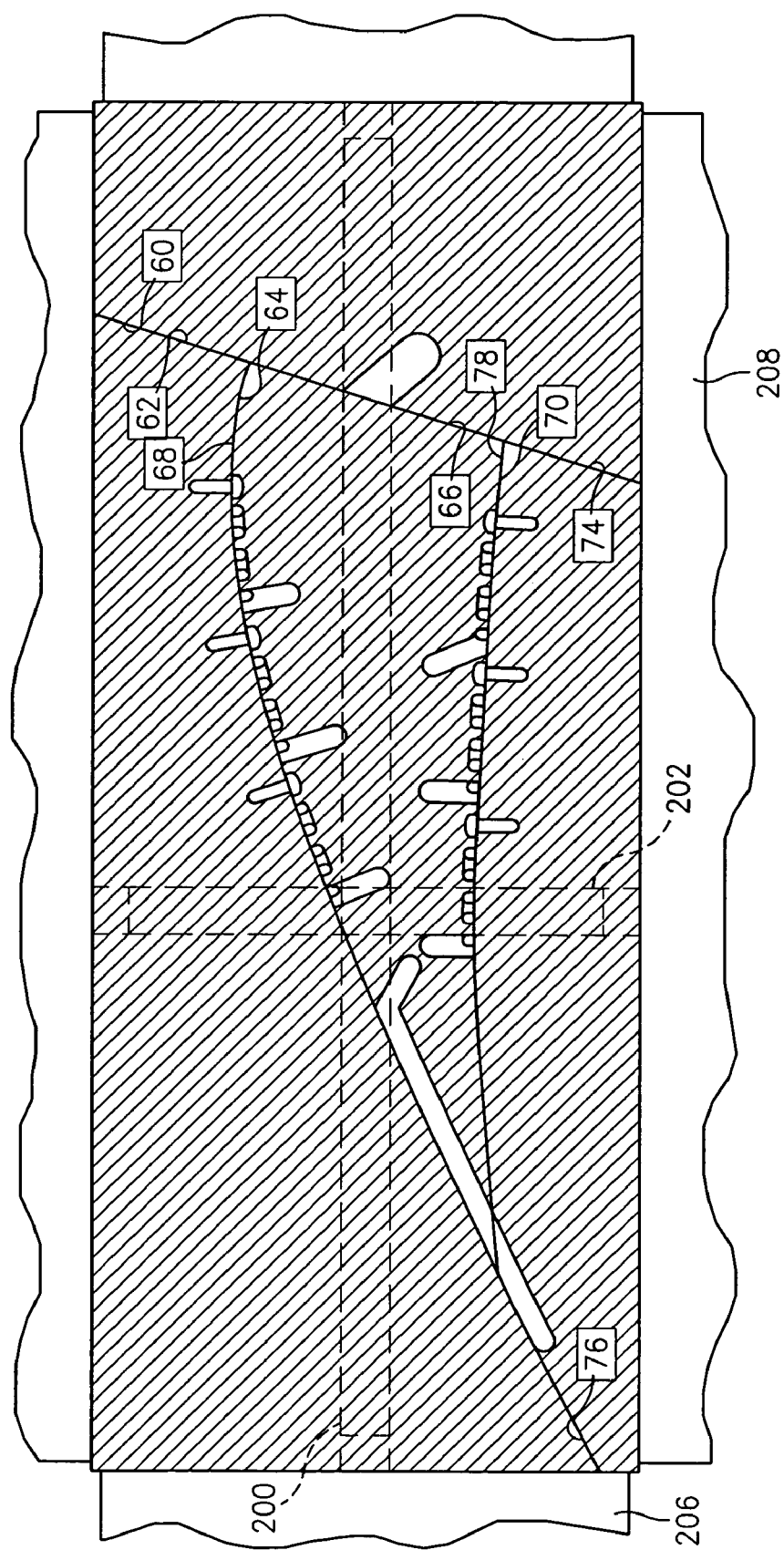
FIG. 4 is a cross-sectional view of the precursor of FIG. 1 in a reassembled condition.
Figure 5:
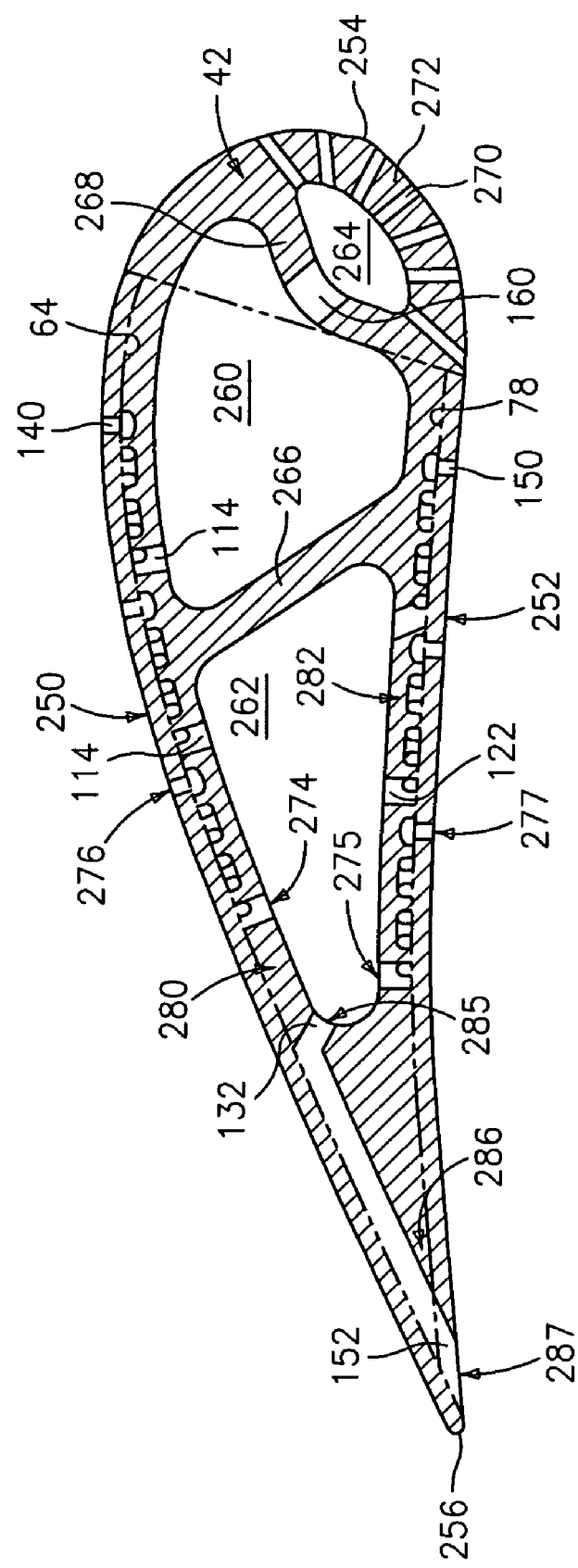
FIG. 5 is a cross-sectional view of an airfoil machined from the reassembled precursor.

With the subpieces disassembled from each other, various features may be machined into their cut surfaces. Prior to the machining, each individual subpiece may be registered in a fixture (not shown) such as via the portions of the registration holes/bores 24, 26, 28, and/or 30 located in such subpiece. A drill or milling bit or like machine tool element may be registered off such hole/bores for precise positioning of the features to be machined into the cut surfaces. FIG. 3 shows the suction side cut surface 68 of the core subpiece 46. In the exemplary embodiment, a streamwise and spanwise array of individual non-intersecting shallow circuits 100 are machined in the surface 68 to a generally constant shallow depth $D_1$ (FIG. 2). Each exemplary circuit 100 is formed as a series of three interconnected elongate obround channels 102 (downstream, upstream and intermediate relative to the airfoil section and not to ultimate cooling flow through the circuits). Each channel 102 surrounds a central island 104. Adjacent channels 102 are interconnected by central gaps 106 in intact portions of the core subpiece defining dividing walls 108 between the channels 102. Thus, the circuits 100 extend from a downstream leg 110 of the downstream channel, to an upstream leg 112 of the upstream channel. Centrally intersecting each leg 110, a deeper hole or blind bore 114 (FIG. 2) is drilled. Similar circuits 120 and blind bores 122 may be formed on the suction side cut surface 70. Other circuit configurations and degrees of interconnectedness are possible as are other numbers and configurations of bores 114 and 122. As is described in further detail below, ultimately the circuits 100 and 120 will form suction and pressure side wall cooling circuits.

FIG. 3 further shows a spanwise series of streamwise elongate slots 130 milled in the suction side cut surface 68. In the exemplary embodiment, these slots are aligned downstream of associated streamwise groups of the circuits. These slots each have a flat bottom/base with an exemplary shallow depth $D_2$ and extend from a leading end at a relatively deeper blind bore 132 to a trailing end at the intersection 72 and thus cut through trailing portions of the suction side cut surface 70. As is described in further detail below, ultimately these slots 130 will help form trailing edge outlet slots.

Additional features may be machined into the cut surfaces of the other subpieces 42, 44, and 48. In the exemplary embodiment, the second cut surface 64 of the suction side subpiece 44 is machined via the drilling of blind bores 140. Exemplary bores 140 are positioned to align with associated upstream legs 112 of the core subpiece circuits 100. Similarly, the third cut surface 78 of the suction side subpiece 48 is machined via the drilling of blind bores 150 positioned to align with the upstream legs of associated circuits 120. Slots 152 are machined in the second cut surface 76 extending through the junction with the third cut surface 78 to align with the slots 130 and form therewith continuous slots upon reassembly. A spanwise series of blind bores 160 are drilled in the cut surface 60 of the leading subpiece 42. Upon reassembly, these bores 160 align with the first cut surface 66 of the core subpiece 46.

After the machining of features through the cut surfaces, the block may be reassembled. During reassembly, pins 200 may be positioned in the holes 24 and 26 and pins 202 in the holes 28 and 30. Exemplary pins are short enough so that their ends may become subflush to the associated block faces. The pins are advantageously formed of an alloy or other material suitable for the bonding environment so as to remain intact and constrain (e.g., eliminate or minimize) the relative movement between subpieces. Advantageous material 1) has a melting point and/or strength at the bonding temperature as great as or higher than those of the material being bonded and 2) has a coefficient of thermal expansion close to that of the material. At high bonding temperatures, tungsten may be advantageous because of its high melting point and lack of thermal creep to keep the subpieces from sliding in the bond surface plane. Depending on the subpiece material, the temperature required for bonding, and other bonding environment conditions (oxidation, etc.) other suitable pin alloys could be selected.

The reassembled block is placed within a press having opposed pairs of jaws 206 and 208 engaging the block X- and Y-faces to compress the block. The compression is advantageously performed under heating. The compression and heating will initially slightly deform the pieces to permit full remating of the adjacent cut surfaces. If the cuts are constant thickness, the local radii of curvature of two adjacent cut surfaces are mismatched by this thickness. Thus, the deformation may be required to accommodate the mismatch. Where the radii of curvature are large, the mismatch is proportionally insignificant. As the radii decrease, the mismatch may be more significant. It may thus be impractical for the second and third cuts 54 and 56 to parallel the ultimate airfoil suction and pressure side surfaces in low radius of curvature areas such as a leading edge region of the airfoil. Accordingly, the first cut 40 leaves the core subpiece as including only the higher radii of curvature portions of the airfoil contour and thus the core subpiece does not include an airfoil leading edge contour. The heating and compression are advantageously sufficient to diffusion bond the subpieces to each other to reintegrate the assembly. Alternative integrations (e.g., transient liquid phase (TLP) bonding, welding, or brazing) are also possible.

For extremely high temperature bonding (e.g., >3000° F., >5 hr, >10 psi), there are few fixture metals that remain stiff and capable of exerting a force to the subpiece assembly to insure bonding. Fixture elements 206 and 208 may be biased by gravity. For example, one may be a large dead-weight applied to the top of the subpiece stack while the other is a support surface. Such a system may be associated with subpiece bond surfaces close to the horizontal. In the exemplary airfoil, using this method may preclude simultaneous bonding of the leading edge subpiece. This may be done in a second bond after an initial first bond of the pressure side, suction side, and center subpieces.

After reintegration, an external airfoil contour may be machined and additional internal features may be machined, using the same registration features to maintain location. An exemplary process involves rough machining a suction side surface 250 and a pressure side surface 252 extending between a leading edge 254 and a trailing edge 256. A major portion of the suction side surface 250 extends parallel to the now-integrated cut surface 64 by a relatively small thickness. A leading portion of the surface 250 is formed along the leading subpiece 42. The machining of the suction side surface 250 exposes the bores 140 to define outlets on the suction side surface. Similarly, the pressure side surface 252 is spaced apart from the cut surface 78 and exposes the bores 150 and the slots 152. Internal features may be machined such as feed passageways 260 and 262 and a leading edge cavity 264. These may be machined through one or both of the Z-faces of the block. In the exemplary embodiment, the feed passageways 260 and 262 are separated by a web 266 and the leading edge cavity 264 is separated from the feed passageway 260 via a web 268. The cavity 264 and passageway 260 intersect the bore 160 to permit communication therebetween. Additionally, the passageways 260 and 262 intersect various of the bores 114 and 122 and the bore 132 to define inlets to the cooling circuits and trailing edge slots. Additionally, a spanwise and streamwise array of leading edge holes 270 are drilled into the cavity 264.

In ultimate operation of the exemplary airfoil, air may be introduced to one or both of the passageways 260 and 262 (potentially with one feeding the other via impingement through the wall 266 or a turn at one end of the airfoil). From the exemplary feed passageway 260, air passes through the bores 160 into the cavity 264 and out the holes 270 to cool a leading edge wall portion 272 of the airfoil. Additionally, from the passageways 260 and 262 air enters the cooling circuits through inlets 274 and 275 of the bores 114 and 122 and passes along the circuitous routes of the cooling circuits 100 and 120 exiting the outlets 276 and 277 of the bores 140 and 150 to cool the suction and pressure side airfoil walls 280 and 282. The circuits are advantageously sufficiently circuitous so that there is no line-of-sight path between each inlet and outlet. Additionally, air entering the trailing edge slots through inlets 285 of the bores 132 cools a trailing portion 286 of the airfoil before exiting outlets 287.

An infinite number of additional variations are possible for airfoil cooling. Cooling circuits may be formed in the suction and pressure side subpieces 44 and 48 instead of in the core subpiece 46. The circuits may be formed spanning junctions between the core subpiece and the suction and pressure side subpieces (e.g., by having mating halves of patterns on each adjacent cut surface or by having non-mirror-image patterns wherein cooling air passes fully through the circuit defined on one subpiece and then enters the circuit of the mating subpiece).

Figures 6, 7:
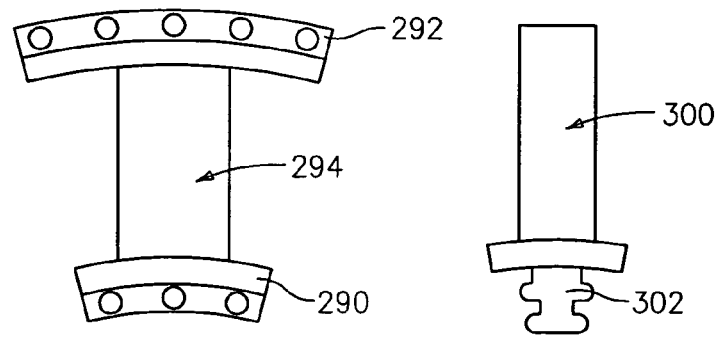
FIG. 6 is a view of a vane.
FIG. 7 is a view of a blade.

In an exemplary implementation, after the rough machining of the pressure and suction side surfaces and internal features, the central portion 22 may be cut from the outboard portions 32 and 34. After such cutting, the central portion may be integrated with one or more end pieces for forming end features of the associated turbine element. For example, FIG. 6 shows end pieces as an inboard platform 290 and an outboard platform 292 at either end of an airfoil 294 manufactured as above to form a vane. This assembly may be integrated via diffusion bonding, welding, brazing, and the like. The end pieces 290 and 292 may be largely pre-formed in final or near final shape or may be near blocks requiring even the rough shaping of features such as mounting features and passageways for communicating with the airfoil passageways 260 and 262. FIG. 7 shows an airfoil 300 manufactured as above integrated with an inboard root end piece 302 to form a blade.

Figure 8:
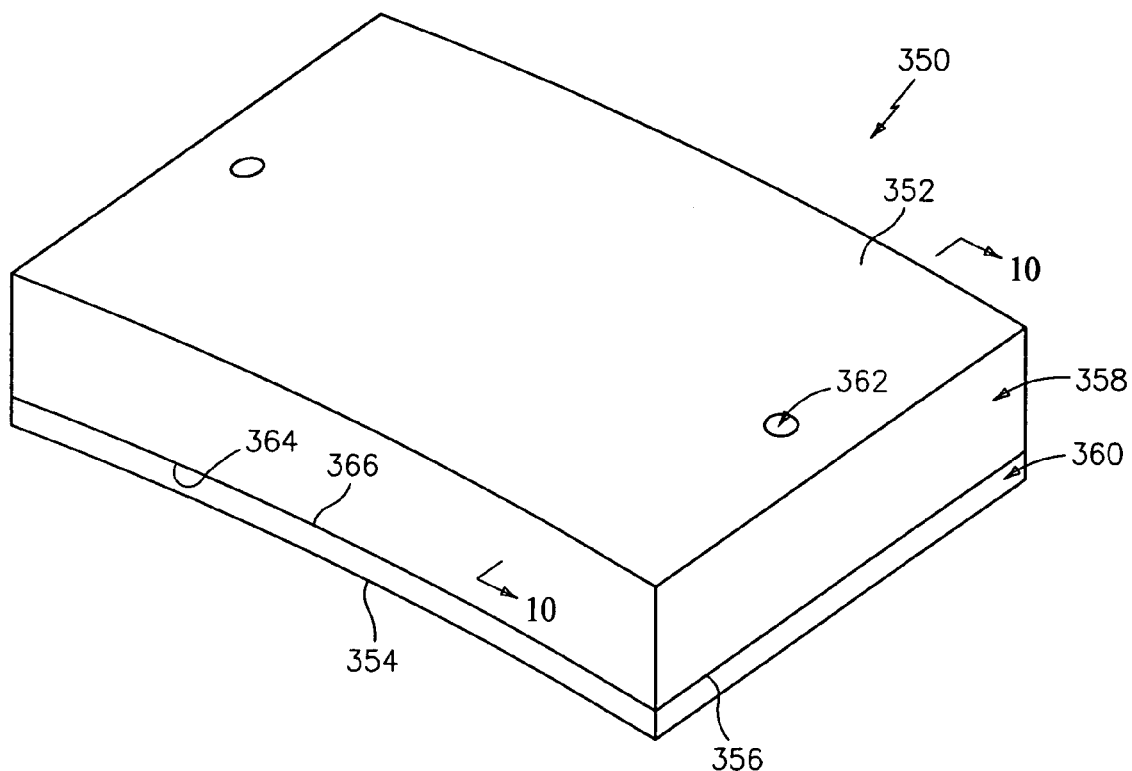
FIG. 8 is a view of a blade outer air seal (BOAS) precursor.
Figure 9:
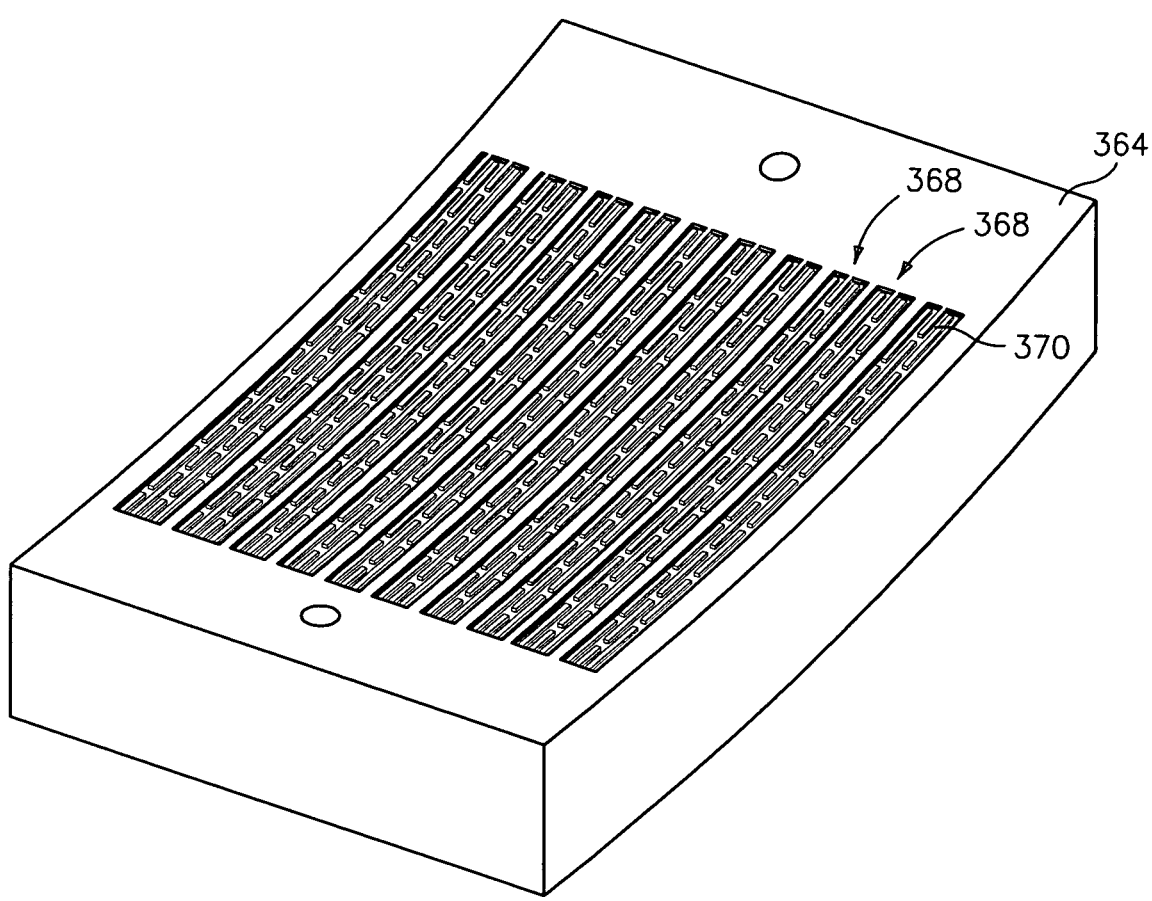
FIG. 9 is a view of a first subpiece of the precursor of FIG. 8.

FIG. 8 shows a blade outer air seal (BOAS) precursor block 350, having a convex outboard surface 352 and a concave inboard surface 354. A first exemplary cut 356 divides the block into outboard and inboard subpieces 358 and 360. Pinning holes 362 may span the cut 356 in similar fashion to those described above. The cut 356 forms a concave cut surface 364 in the outboard subpiece and a convex cut surface 366 in the inboard subpiece. FIG. 9 Shows the concave surface 364 after the machining of a plurality of elongate rows 368 of circuit channels 370. Mirror image, out-of-phase, or other complementary features (not shown) may optionally be machined in the convex cut surface 366.

Figure 10:
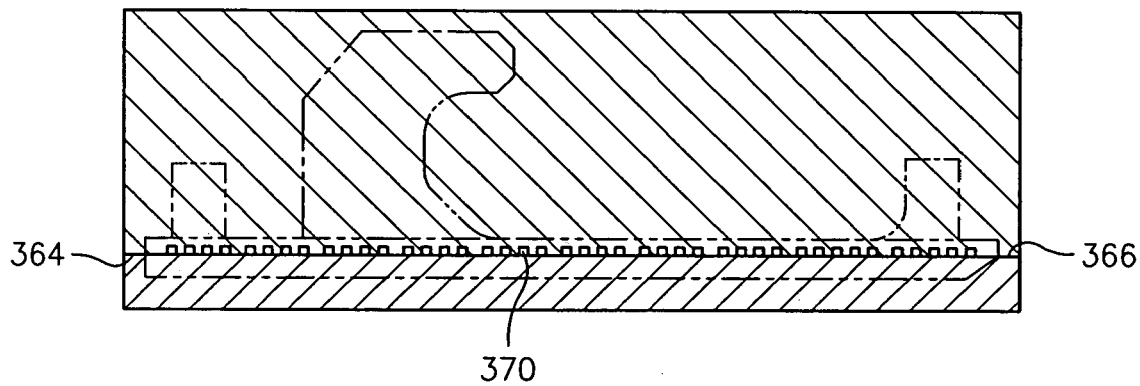
FIG. 10 is a sectional view of the precursor of FIG. 8 in a reassembled condition.
Figure 11:
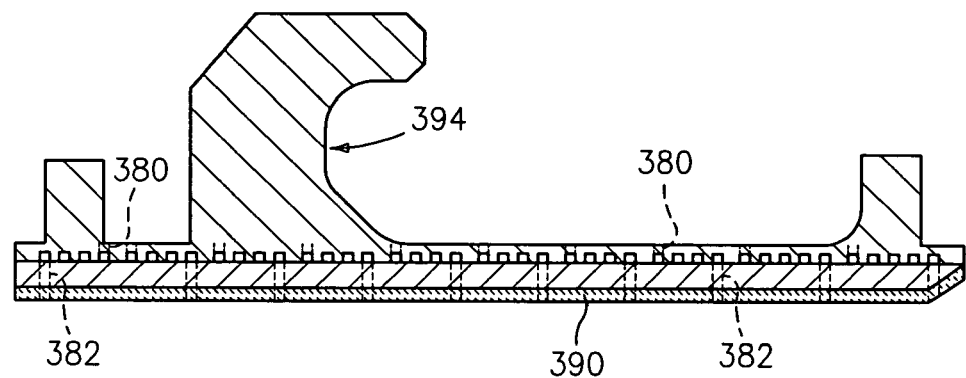
FIG. 11 is a sectional view of a BOAS machined from the precursor of FIG. 8.
Figure 12:
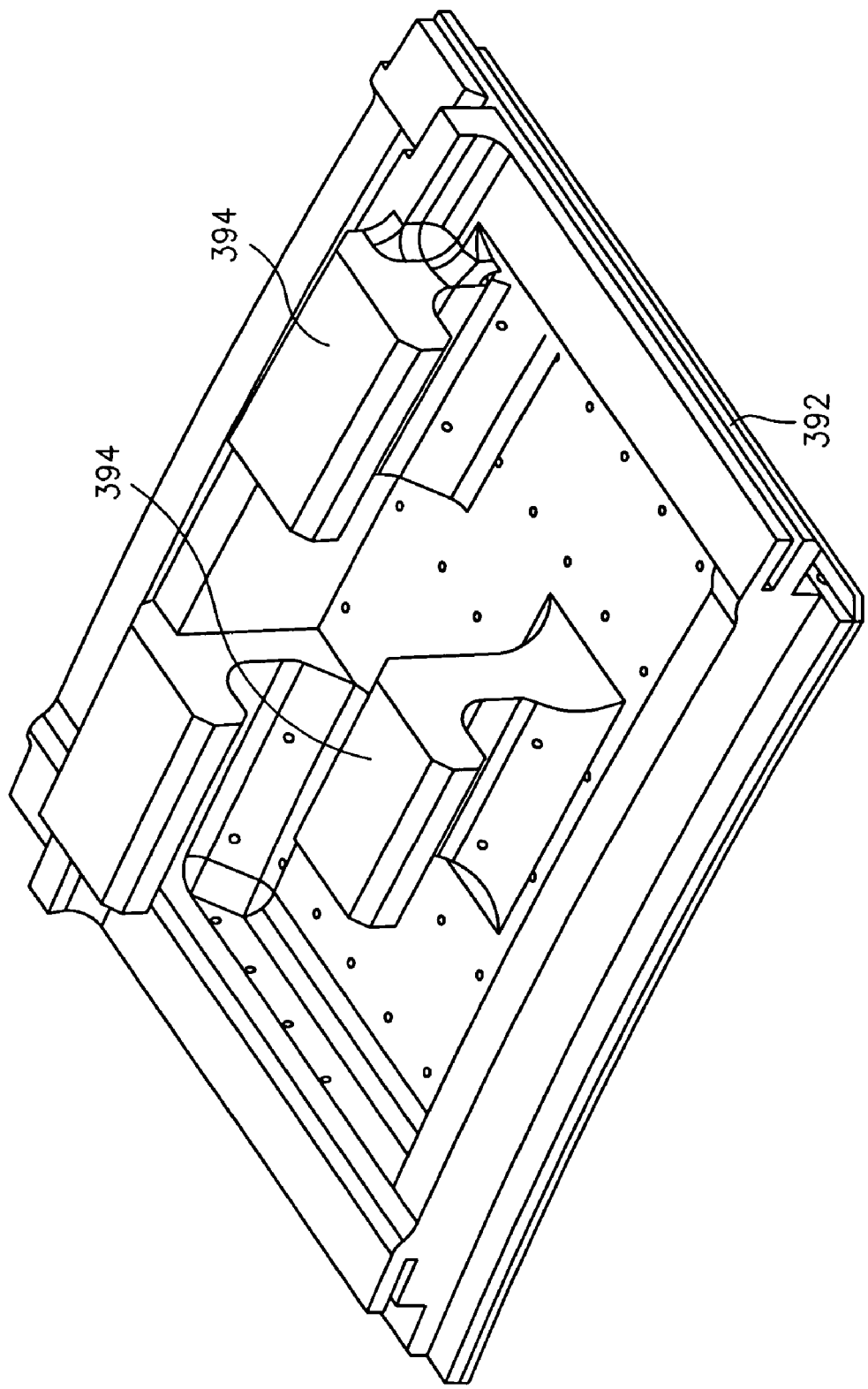
FIG. 12 is a view of the BOAS of FIG. 11.

FIG. 10 shows the outline of the BOAS in the precursor. This includes drilled or otherwise machined inlets 380 to the channels and outlets 382 from the channels. FIGS. 11 and 12 show the BOAS with a thermal barrier coating 390 (FIG. 11), feather seal slots 392 (FIG. 12), and mounting hooks 394 (FIG. 12).

One or more embodiments of the present invention have been described. Nevertheless, it will be understood that various modifications may be made without departing from the spirit and scope of the invention. For example, when implemented in creating a replacement for an existing part, details of the existing part may influence details of the particular implementation. The methods may be used to make other components (e.g., integrally bladed or other rotors, case components, combustor components, exhaust components, and the like). In large scale production, individual subpieces from a given block need not be reintegrated with the other subpieces of that block but may be integrated with subpieces from one or more like blocks. The integration may be of pieces not cut from common or like blocks. Accordingly, other embodiments are within the scope of the following claims.

What is claimed is:

1. A method for manufacturing a turbine engine component having one or more internal feed passageways, one or more external walls, and one or more outlet passageways through the one or more external walls, the method comprising:
    cutting one or more cuts in a workpiece to create a plurality of separate subpieces each having one or more cut surfaces;
    providing a plurality of apertures in the one or more cut surfaces;
    after said providing, reassembling a combination of said subpieces or of like subpieces; integrating the combination; and
    machining at least portions of the internal feed passageways so that at least some of said outlet passageways are formed by combinations of said apertures from separate ones of said subpieces, wherein said machining said at least one internal feed passageway is generally transverse to said plurality of apertures in each of said pairs so as to ultimately intersect therewith.

2. The method of claim 1 wherein:
    the component includes an airfoil having a pressure side surface and a suction side surface, at least some of said outlet passageways have an outlet along the pressure side or suction side surface.

3. The method of claim 2 further comprising:
    assembling the combination to an airfoil end piece; and
    integrating the combination with the airfoil end piece.

4. The method of claim 3 further comprising:
    machining said airfoil end piece to form at least one of: a vane inboard platform; a vane outboard platform; and a blade root structure.

5. The method of claim 2 wherein:
    a junction between a first of said subpieces and a second of said subpieces is locally generally parallel to one of said pressure and suction side surfaces and falling within a pressure side wall or a suction side wall, respectively.

6. The method of claim 2 wherein:
    the providing of the plurality of apertures includes, in at least one said surface, providing a circuitous channel with a relatively deep bore along the channel, the relatively deep bore being open to an associated said internal feed passageway so as to define an inlet to the associated outlet passageway.

7. The method of claim 1 further comprising forming registration features and wherein said reassembling comprises registering said registration features.

8. The method of claim 7 wherein:
    the registration features comprise holes and the forming comprises drilling said holes.

9. The method of claim 1 wherein:
    the machining further comprises machining exterior surfaces of the one or more external walls.

10. The method of claim 1 wherein:
    some of said outlet passageways are formed by single ones of said apertures.

11. The method of claim 1 wherein:
    some of said apertures form internal connecting passageways between associated pairs of said feed passageways.

12. The method of claim 1 wherein:
    said cutting comprises wire electro-discharge machining.

13. The method of claim 1 wherein:
    at least one of said cuts is arcuate.

14. The method of claim 1 wherein:
    said cutting comprises wire electro-discharge machining; and
    said machining the internal feed passageways comprises electrochemical machining.

15. The method of claim 1 wherein:
    the integrating comprises one of transient liquid phase bonding and diffusion bonding.

16. The method of claim 1 wherein:
    the integrating comprises at least one of welding and brazing.

17. The method of claim 1 wherein the workpiece comprises a refractory metal.

18. The method of claim 1 wherein the workpiece comprises a refractory metal or alloy thereof and contains 10-80 by weight of one or more intermetallics.

19. The method of claim 1 wherein
    at least one of said at least some of said outlet passageways has an inlet on a first side of a junction of the associated reassembled subpieces and an outlet on the other side of said junction.

20. A method for manufacturing a turbine engine component having one or more internal feed passageways, one or more external walls, and one or more outlet passageways, the method comprising:
    cutting one or more cuts in a workpiece to create a plurality of separate subpieces each having one or more cut surfaces;
    providing a plurality of apertures in the one or more cut surfaces;

reassembling a combination of said subpieces or of like subpieces;

integrating the combination; and machining at least portions of the internal feed passageways so that at least some of said outlet passageways are formed by combinations of said apertures from separate ones of said subpieces, wherein:

the component includes an airfoil having a pressure side surface and a suction side surface, at least some of said outlet passageways have an outlet along the pressure side or suction side surface;

a junction between a first of said subpieces and a second of said subpieces is locally generally parallel to one of said pressure and suction side surfaces; and a junction between said first of said subpieces and a third of said subpieces is locally generally parallel to the other of said pressure and suction side surfaces.

21. The method of claim 20 wherein:

the providing of the plurality of apertures includes cutting slots in a suction side of the surface of the first piece positioned to form trailing edge outlet slots.

* * * * *